Patented Mar. 5, 1940

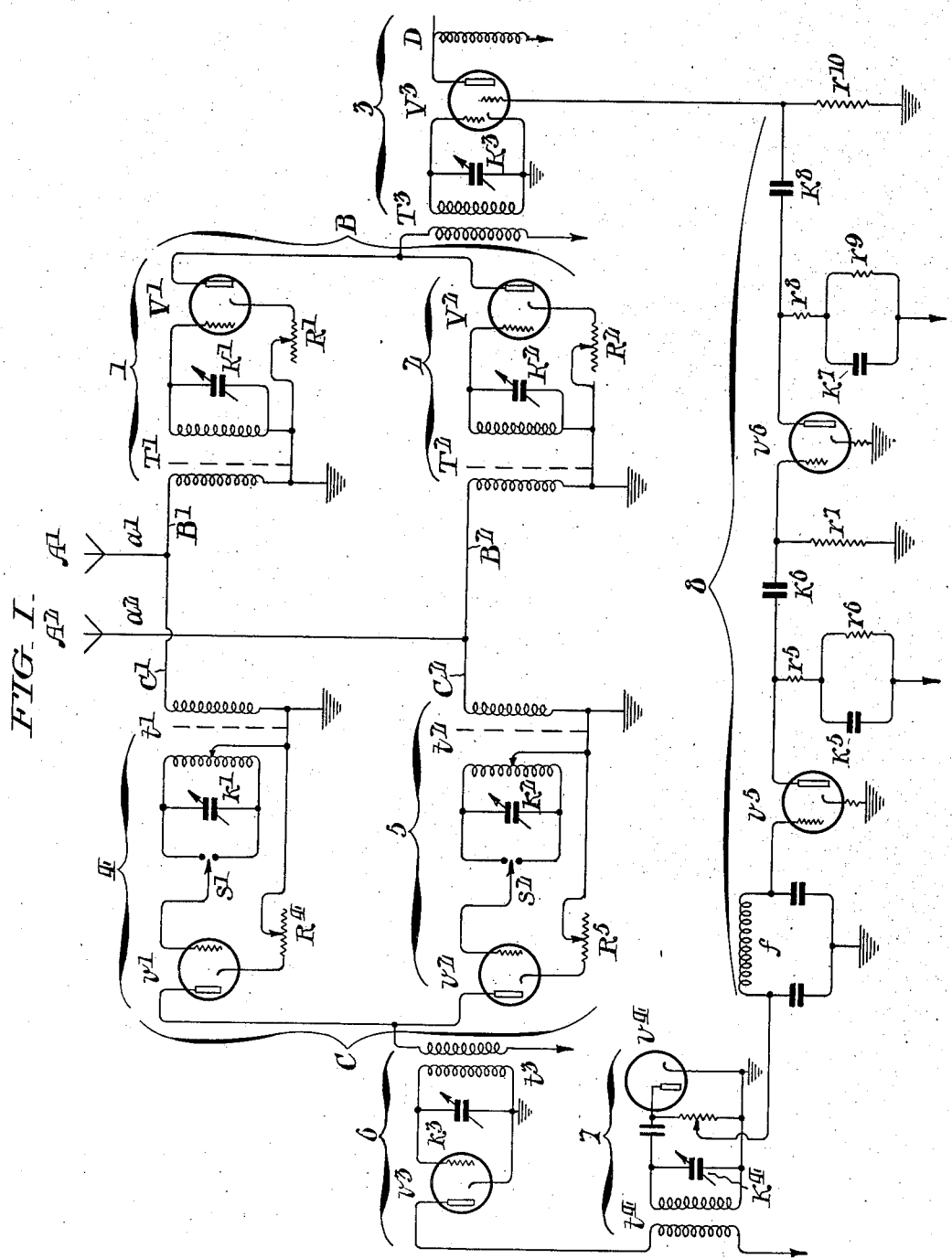

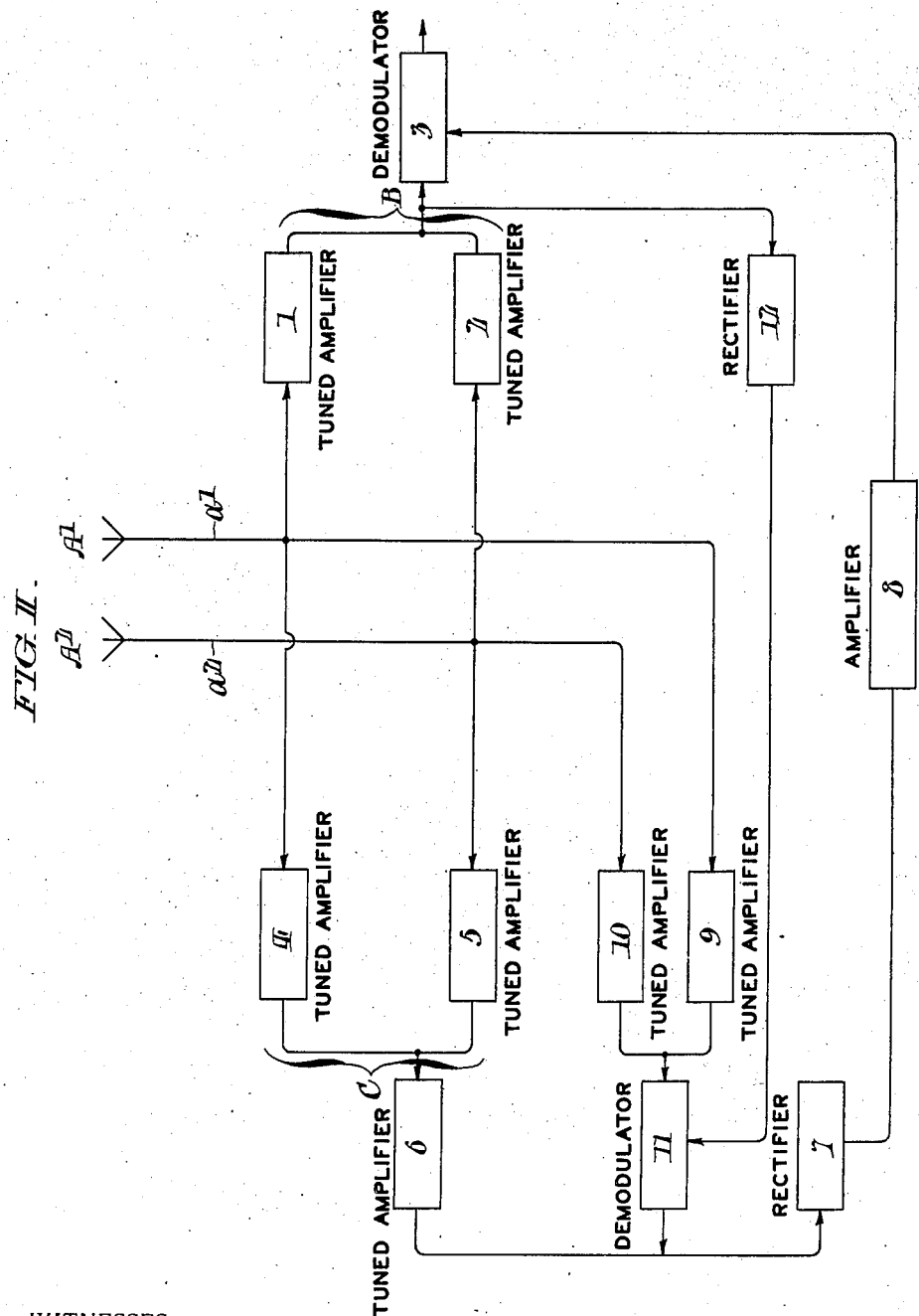

2,192,275

UNITED STATES PATENT OFFICE 2,192,275

INTERFERENCE ELIMINATION

Horace W. Royer, Bristol, Pa.

Application July 15, 1938, Serial No. 219,309

9 Claims. (Cl. 250—20)

This invention relates to the reception of energy and to systems therefor, such as radio or television systems, and is especially concerned with the elimination of interference encountered in the use of such systems.

In the operation of radio and television systems now in use, so-called interference difficulties are universally experienced from time to time. The interference may have its origin in atmospheric disturbances, such as electrical storms, or it may be man-made, one such source being found in the ignition systems of automobiles. Another source of interference is the formation of beat notes by heterodyne action. Whatever their origin, the interference voltages are picked up in the receiving antenna(e) system(s), and are passed along with those that carry the desired intelligence or signals to the receiving system proper. The effect of such interference on radio reception is to produce undesired sound effects at the loud speaker; while in the case of television, the effect is to distort or scramble the image at the television receiver.

Various measures have heretofore been proposed for the elimination of interference difficulties. For instance, it has been proposed to utilize the interference voltages above a certain determined value in such a way as to render the receiving system inoperative during the very short intervals in which the interference voltage exceeds such value. This is open to a number of objections, one of which is that it does not eliminate interference voltages below the determined value. It has also been proposed to balance out the interference voltages, leaving only the desired carrier voltages, as described in U. S. Patent No. 1,468,062 to R. A. Weagant; but the result of this leaves much to be desired. A variation of this scheme involves the cancellation of the desired carrier voltages by balancing against one another two portions of a system having separate antennae, thus obtaining interference voltages without carrier voltages, and then balancing these interference voltages against voltages in or from a third antenna portion of the system, containing interference as well as the desired carrier, this being the so-called "static tank" scheme described in U. S. Patent No. 1,468,061 to R. A. Weagant. In the operation of this scheme, however, the interference voltages in the third antenna portion of the system are not the same as the interference voltages obtained by balancing out the carrier in the other two portions. The net result is that the interference existing in the third antenna portion is not eliminated, but is passed on to the receiving system proper.

The present invention differs from all of the schemes mentioned above, and produces an elimination of interference not obtainable with any of them. This is accomplished by utilizing an antenna system having two portions in which the phase relationship between the desired signals and the interference voltages differ. For this there may be a single antenna extending a relatively long distance; or there may be two separate antennae in which the voltage effects will differ as functions of wave length, angle of incidence, or wave front. In particular, a commercial radio set having a built-in loop antenna may be used with an out-door antenna wire as a second antenna.

Two receiving circuits are connected to different portions of the antenna system. In one of the receiving circuits (conveniently distinguished as the first circuit), the carrier and interference voltages from the two antennae portions are cumulatively combined; while in the other receiving circuit (distinguished as the second circuit), the carrier voltages from the two antennae portions are combined in opposition and are thereby balanced out against one another, leaving only the combined interference voltages of the two antennae. These combined interference voltages are changed to a different (lower) frequency by rectification, detection, or other means; and the resulting interference effects thus derived from the second circuit are in turn combined in opposition with the mingled carrier and interference voltages from the first circuit. This may be done either after changing the first circuit voltages to audio or other (lower) frequency, or before such conversion. In general, the lower frequency effects obtained by conversion of the combined interference voltages have the character of (rectified) averages. In either case, the effect is substantially to eliminate troublesome interference voltages coming from the first circuit, so that, ultimately, any traces of the interference voltages are negligible and without effect in the loud speaker or the television receiver. In other words, the constants of the intervening circuits are made such that the interference effects which can come through to the loud speaker, television screen or other ultimate receiver are of frequencies which the latter cannot audibly or visibly reproduce. The lower range of frequencies to which the interference voltages are converted as above set forth is purposely chosen with a view to this result.

For the purpose of obviating or eliminating heterodyne interference effects, a carrier synchronous with the desired carrier frequency may be combined with the combined interference effects prior to rectification or detection, as explained hereinafter. For this purpose, only a pure unmodulated carrier is required, which may be obtained (with elimination of side-band components) from the impulses from the antenna system, or in any suitable way, as by means of a closely controlled independent oscillator synchronous with the desired pure carrier in frequency and phase.

In the drawings, Fig. I is a diagram illustrating one type and form of system embodying my invention.

Fig. II is a block diagram showing the system of Fig. I with added means for eliminating beat note interference.

In Fig. I, the antenna system is shown as comprising two antennae A1 and A2, arranged so as to be differently affected by the incident carrier and interference energy. To each of the antennae circuits a1 and a2 are connected two receiving circuits B and C, each of which thus receives both the carrier and the interference waves and voltages picked up by antennae A1 and A2. As the carrier and interference will not, generally, have the same phase relationship at both the antennae A1 and A2, at the same instant, it will generally be possible to balance and cancel out the carrier voltages from the two antennae against one another, as hereinafter described, while retaining uncancelled the interference voltages.

Referring first to the circuit B, it will be seen that through its branch B1 the carrier and interference voltages from antenna circuit a1 are applied to the primary of transformer T1, and are taken from its secondary to the grid of tube V1, variable condenser K1 being used to tune this part of the system (collectively designated 1) to the desired frequency. Through the branch B2 of circuit B, the carrier and interference voltages from antenna circuit a2 are applied to the primary of transformer T2 and are taken from its secondary to the grid of tube V2, variable condenser K2 being used to tune this part of the system (collectively designated 2) to the desired frequency. The plate circuits of the tubes V1 and V2 are combined in the circuit B at the right of Fig. I; and inasmuch as the voltages at T1 and T2 are in an in-phase relationship, the resultant in the combined plate circuit of B corresponds to the carrier common to A1 and A2 plus the interferences at A1 and A2. This resultant is applied to the primary of the transformer T3, and the voltages in the secondary of transformer T3 are impressed on the grid of the demodulator tube V3, a variable condenser K3 being used to tune this part of the system (collectively designated 3) to the desired frequency.

Referring, now, to the circuit C, it will be seen that through its branch C1 the carrier and interference voltages from antenna circuit a1 are applied to the primary of transformer t1, which has a center-tapped secondary tuned by a variable condenser k1. These voltages are taken from the secondary of t1 and impressed on the grid of tube v1, a switch s1 being provided for shifting the phase of said voltages, this part of the system being collectively designated 4. Similarly, through the branch C2 of circuit C, the carrier and interference voltages from antenna circuit A2 are applied to the primary of transformer t2, which has a center-tapped secondary tuned by a variable condenser k2. These voltages are taken from the secondary of t2 and impressed on the grid of the tube v2, a switch s2 being provided for shifting the phase of these voltages, this part of the system being collectively designated 5. By means of the switches s1 and s2 and the variable condensers k1 and k2, the intelligence voltages impressed on the grids of tubes v1 and v2 may be made 180° out of phase with respect to each other. The plate circuits of the tubes v1 and v2 are combined in the circuit C at the left of Fig. I. In this circuit C, the intelligence from the antenna circuits a1 and a2 balance or cancel out, being equal and opposite in character, so that the resultant in the circuit C corresponds to the sum of the interference voltages from the antenna circuits a1 and a2. It is desirable to maintain the amplitudes at 1, 2, 4, and 5 at a substantially equal level. This is accomplished by means of suitable controls such as are shown at R1, R2, R4, and R5. These particular means shown on Fig. I are adjustable resistances in the cathode circuits but other suitable means may be employed for this purpose.

The output from circuit C is fed to the primary of the transformer t3, variable condenser k3 being provided for tuning to the desired frequency, and amplification is effected by the tube v3, this part of the system being collectively designated 6. The amplified current from the plate circuit of tube v3 is fed through the primary of the transformer t4, the secondary of which feeds the rectifier tube v4, variable condenser k4 being provided for tuning to the desired frequency, this part of the system being collectively designated 7. The output from the rectifier tube v4 is fed through the high frequency filter f to the tube v5 and the averages in the plate circuit of the tube v5 are then further amplified by tube v6; and condensers k5, k6, k7, k8, and resistances r5, r6, r7, r8, r9, and r10 are provided and so chosen as to produce a "flat" amplification, as to both amplitude and phase, without distortion. The parts of the system referred to in the preceding sentence may be collectively designated 8. From the plate circuit of the tube v6, the amplified averages resulting are fed to one of the grids of the demodulating tube V3 (in the portion of the system designated 3), whose other grid is fed from the combined plate circuit B of the tubes V1 and V2 through the transformer T3, as already mentioned. The number of tubes used from the rectification stage 7 on is such that the voltage at the demodulation stage 3 will be 180° out of phase with the interference side-band components existing in the output from T3.

Thus the combined interference effects existing in the grid of the tube V3 (along with the carrier effects) are demodulated by the amplified interference averages from the plate of the tube v6. As a result, the plate circuit D of the tube V3 contains the combined carrier effects from the antennae a1 and a2 substantially without the interference effects, which have been eliminated by demodulation. In other words, substantially all of the troublesome interference is eliminated at V3, so that ultimately any traces of the interference effects passing through the circuit D to the usual detection and amplification system(s) are negligible and without effect in the loud speaker or the television receiver.

It will be observed that in the system as shown in Fig. I the desired carrier from both antenna portions A1 and A2 is eliminated in the part of the system designated C, by the coaction of its parts 4 and 5. As a result, beat note interference which may arise from one or more other carriers beating with the one of desired frequency are not eliminated in the demodulation at 3. In order to obviate or eliminate such beat note interference, a pure unmodulated carrier of the desired frequency may be introduced or put back into the system in a suitable way, so that beat note interference may be eliminated in the demodulation at 3, where the desired and undesired frequencies are impressed on the input sides of the demodulator 3.

While various means of introducing the (unmodulated) carrier of desired frequency may be employed, such for instance as a closely controlled independent oscillator synchronous with this frequency, Fig. II illustrates one way of supplying the desired unmodulated carrier from the receiving antenna system. For this purpose, devices 9 and 10 corresponding to the devices 1 and 2 are similarly connected to the antenna circuits a1 and a2, and their combined plate circuit is connected to feed into one grid of a demodulating device 11, similar to that at 3. The demodulating impulses for the second grid of the demodulator at 11 are taken from the combined plate circuit B of the devices 1 and 2 being reduced in frequency through a rectifier or the like 12, similar to that at 7. The output from the demodulator at 11 contains the desired carrier with side bands demodulated and is fed into the system at the input side of the rectifier or the like 7. As a result, the desired carrier is combined with the (amplified) interference effects from the circuit C and is rectified and amplified therewith at 7 and 8, so that in the demodulation at 3 the frequencies from 1 and 2 that would otherwise give rise to beat note interference are eliminated.

It will, of course, be understood that the particular instrumentalities hereinbefore referred to are illustrative, and that others of suitable character may be substituted. For example, the half wave rectifier v4 and the filter f might both be replaced by a full wave rectifier, which would render the use of a filter unnecessary. Moreover, various types of detectors might be used instead of the rectifier v4, such, for example, as a grid leak detector, a grid bias detector, a plate detector, an impedance detector, or an infinite impedance detector. Again, for the demodulator V3 might be substituted a plate modulator or a screen grid modulator, etc. With the exception of rectifier tube v4 and demodulator tube V3, the tubes in the diagram of Fig. I are shown as triodes; but it will be understood that other suitable tubes such as screen grid or pentodes may be substituted, particularly where increased gain is desired. The separate antennae A1 and A2 represent only one type of antenna system extended or organized so that there will be a phase difference between energy waves affecting different portions thereof, and might be replaced by two loop antennae arranged at an angle to one another, or by a single very long antenna, with the receiving circuits B and C connected to portions thereof remote from one another. Of course the usual heating current connections (not shown) will be provided for the cathodes of the various tubes at 1, 2, 3, 4, 5, 6, 7, 8, 9, 10, 11, and 12, as well as the usual plate voltage connections where indicated by the arrowheads in Fig. I.

Having thus described my invention, I claim:

1. In the reception of radiant energy by an antenna system organized to afford a phase difference between energy waves incident on different portions thereof, a method of eliminating interferenc which comprises combining cumulatively carrier and interference effects derived from such different portions of the antenna system; balancing out against one another carrier effects separately derived from such different portions of the antenna system, while retaining the corresponding interference effects; converting to substantially lower frequency these retained interference effects; and combining the converted effects in opposition with mingled carrier and interference effects, thereby substantially eliminating the interference components therefrom.

2. A method as set forth in claim 1 which further comprises converting to substantially lower frequency the combined carrier and interference effects from the antenna system, combining a carrier of the desired frequency and phase in opposition with such combined carrier and interference effects, and combining the resultant with the retained interference effects before converting them to lower frequency and combining them in opposition with the mingled carrier and interference effects.

3. The method as set forth in claim 1 wherein the mingled carrier and interference derived as therein set forth are demodulated with the converted interference effects of lower frequency.

4. A method as set forth in claim 1 which comprises converting to substantially lower frequency the combined carrier and interference effects from the antenna system, demodulating the carrier of desired frequency and phase with such mingled carrier and interference effects, and combining the resultant with the interference effects before combining the latter in opposition with the mingled carrier and interference effects.

5. A method as set forth in claim 1 wherein the cumulatively combined carrier and interference effects are themselves converted to effects of substantially lower frequency before being combined in opposition with the converted interference effects.

6. In the reception of radiant energy, the combination of an antenna system organized to afford a phase difference between energy waves incident on different portions thereof; receiving circuits each connected to both such portions of the antenna system, one of said receiving circuits including means for cumulatively combining the carrier and interference effects from both of said portions, and the other of said receiving circuits including means for eliminating the carrier effects from both of said portions, while retaining the combined interference effects; means for converting to substantially lower frequency these retained interference effects; and means for combining the converted interference effects in opposition with mingled carrier and interference effects derived from the first-mentioned receiving circuit, whereby interference is substantially eliminated, while the carrier effects are retained.

7. The combination as set forth in claim 6 comprising means for converting to substantially lower frequency the combined carrier and interference effects from the first receiving circuit, an additional receiving circuit connected to both portions of the antenna system and including means for cumulatively combining the carrier and interference effects from both of said portions, and means for demodulating such combined carrier and interference effects with the mingled carrier and interference effects from the first-mentioned receiving circuit, and for feeding the resultant along with the retained interference to the converting means.

8. The combination as set forth in claim 6 comprising means for demodulating the mingled carrier and interference effects derived from the first receiving circuit with the converted interference effects of lower frequency derived from the second receiving circuit.

9. The combination as set forth in claim 6 comprising means for converting the cumulatively combined interference effects from the first receiving circuit to substantially lower frequency before combining them with the interference effects of lower frequency derived from the second receiving circuit.

HORACE W. ROYER.